(12) United States Patent
Kasahara et al.

(10) Patent No.: US 9,893,670 B2
(45) Date of Patent: Feb. 13, 2018

(54) INVERTER CONTROL APPARATUS AND AIR CONDITIONER

(71) Applicant: Hitachi-Johnson Controls Air Conditioning, Inc., Tokyo (JP)

(72) Inventors: Rei Kasahara, Tokyo (JP); Dongsheng Li, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 0 days.

(21) Appl. No.: 15/473,688

(22) Filed: Mar. 30, 2017

(65) Prior Publication Data

US 2017/0288594 A1 Oct. 5, 2017

(30) Foreign Application Priority Data

Mar. 31, 2016 (JP) ................................ 2016-070050

(51) Int. Cl.
*H02M 5/42* (2006.01)
*H02M 7/68* (2006.01)
*H02M 3/24* (2006.01)
*H02M 7/44* (2006.01)
*H02M 7/521* (2006.01)
*H02P 27/08* (2006.01)
*H02P 6/18* (2016.01)
*H02P 21/24* (2016.01)
(Continued)

(52) U.S. Cl.
CPC ............ *H02P 27/08* (2013.01); *F25B 49/025* (2013.01); *H02P 6/04* (2013.01); *H02P 6/18* (2013.01); *H02P 21/24* (2016.02); *F25B 2500/05* (2013.01); *F25B 2600/021* (2013.01); *F25B 2600/11* (2013.01); *F25B 2700/15* (2013.01)

(58) Field of Classification Search
CPC ... H02M 7/493; H02M 7/537; H02M 7/53875
USPC ............................................ 363/95, 97, 137
See application file for complete search history.

(56) References Cited

U.S. PATENT DOCUMENTS 5,712,540 A * 1/1998 Toda .................... F24F 11/0009
318/34
5,969,958 A * 10/1999 Nielsen .................. G01R 19/25
318/811
(Continued)

FOREIGN PATENT DOCUMENTS

JP 2004-064903 A 2/2004

*Primary Examiner* — Gary Nash
(74) *Attorney, Agent, or Firm* — Mattingly & Malur, PC

(57) ABSTRACT

A controller of an inverter control apparatus includes an A/D conversion unit that performs digital conversion of an input signal when a signal for either an A/D converter start trigger or an A/D converter start trigger is input thereinto; a first inverter control unit that generates the A/D converter start trigger which starts the A/D conversion unit, based on A/D converter start timing information and a first carrier signal; a second inverter control unit that generates the A/D converter start trigger which starts the A/D conversion unit, based on A/D converter start timing information and a second carrier signal; and an A/D start factor selection unit that receives either the A/D converter start trigger or the A/D converter start trigger and selects an A/D start factor at a predetermined period timing of an operation period of the first carrier signal and the second carrier signal.

10 Claims, 9 Drawing Sheets

(51) Int. Cl.
*H02P 6/04* (2016.01)
*F25B 49/02* (2006.01)

(56) References Cited

U.S. PATENT DOCUMENTS

| | | | | |
|---|---|---|---|---|
| 2007/0241720 A1* | 10/2007 | Sakamoto | ............... | H02P 27/08 318/811 |
| 2010/0066295 A1* | 3/2010 | Katyal | .............. | H02M 7/53875 318/496 |
| 2013/0258734 A1* | 10/2013 | Nakano | ................ | H02M 7/537 363/131 |
| 2014/0312818 A1* | 10/2014 | Furuchi | .................... | H02P 6/14 318/400.29 |

\* cited by examiner

INVERTER CONTROL APPARATUS AND AIR CONDITIONER

CROSS REFERENCE TO RELATED APPLICATION

This application claims the foreign priority benefit under Title 35, United States Code, § 119(a)-(d) of Japanese Patent Application No. 2016-070050, filed on Mar. 31, 2016 in the Japan Patent Office, the disclosure of which is herein incorporated by reference in its entirety.

BACKGROUND OF THE INVENTION

Technical Field

The present invention relates to an inverter control apparatus and an air conditioner.

Background Art

From the viewpoint of reduction of power consumption, an inverter control apparatus is widely used in a refrigerating apparatus such as an air conditioner or a refrigerator so as to drive a high-efficiency motor such as a brushless direct current (DC) motor. There is a sine wave drive method as a motor drive method, which is capable of reducing noise at higher efficiency compared to a drive method using square wave currents and having a simple control configuration. If the sine wave drive method is adopted, an inverter control apparatus controls a motor at an arbitrary rotational speed based on a vector control theory in which the phase or the magnitude of an output voltage is determined based on positional information of magnetic poles of a motor rotor. As means of detecting the positional information of the magnetic poles of the motor rotor, there is position sensorless control technology by which a position is estimated by detecting motor current flowing through each phase of the motor.

JP 2004-64903 A discloses a synchronous motor control apparatus including a timer circuit in which a control circuit prepares pulse width modulation (PWM) signals, and an A/D conversion unit that performs A/D conversion on direct current detected synchronously with the PWM signals. The synchronous motor control apparatus controls a synchronous motor by performing first A/D conversion and second A/D conversion synchronously with PWM signals at constant time intervals, and by reproducing output current of an inverter based on A/D converted first direct current information and second direct current information. In order to obtain two digital conversion results, that is, a first current conversion result and a second current conversion result in every PWM carrier periods, the synchronous motor control apparatus disclosed in JP 2004-64903 A requires two independent analog/digital (A/D) converter units or a high-speed A/D conversion unit which is capable of receiving multiple analog signals and has short A/D conversion times. That is, in order to control one DC motor, the synchronous motor control apparatus requires two independent A/D conversion units or a high-speed A/D conversion unit having a short A/D conversion time.

CITATION LIST

Patent Literature 1: JP-2004-64903 A

SUMMARY OF INVENTION

Technical Problem

In a case where position-sensorless control of multiple DC motors is performed, the technology disclosed in JP-2004-64903 A requires A/D conversion units (two A/D conversion units or one high-speed A/D conversion unit) of the same number as that of DC motors, and thus the cost of a microcomputer including A/D conversion units cannot be reduced, which is a problem.

An aspect of the present invention is to provide an inverter control apparatus and an air conditioner, the costs of which can be reduced.

Solution to Problem

According to an aspect of the present invention, there is provided an inverter control apparatus including: inverter circuits configured to convert direct current power into three-phase alternating current power, and to supply three-phase alternating current power to synchronous motors;

current detection units configured to detect currents flowing through the inverter circuits; and an inverter control unit configured to determine and output voltage command values supplied to the synchronous motors based on the detected currents, wherein the inverter control unit includes an A/D conversion unit that converts the detected currents into digital data;

a first inverter control unit that generates a first trigger which starts conversion in the A/D conversion unit, based on start timing information of the A/D conversion unit and a first carrier signal;

a second inverter control unit that generates a second trigger which starts conversion of the A/D conversion unit, based on start timing information of the A/D conversion unit and a second carrier signal; and an A/D start factor selection unit that receives either the first trigger or the second trigger, and selects an A/D start factor in a predetermined period of an operation periods of the first carrier signal and the second carrier signal.

Advantageous Effects of Invention

According to the present invention, it is possible to provide an inverter control apparatus and an air conditioner, the costs of which can be reduced.

DESCRIPTION OF EMBODIMENTS

Hereinafter, embodiments of the present invention will be described in detail with reference to the accompanying drawings.

First Embodiment

Figure 1:
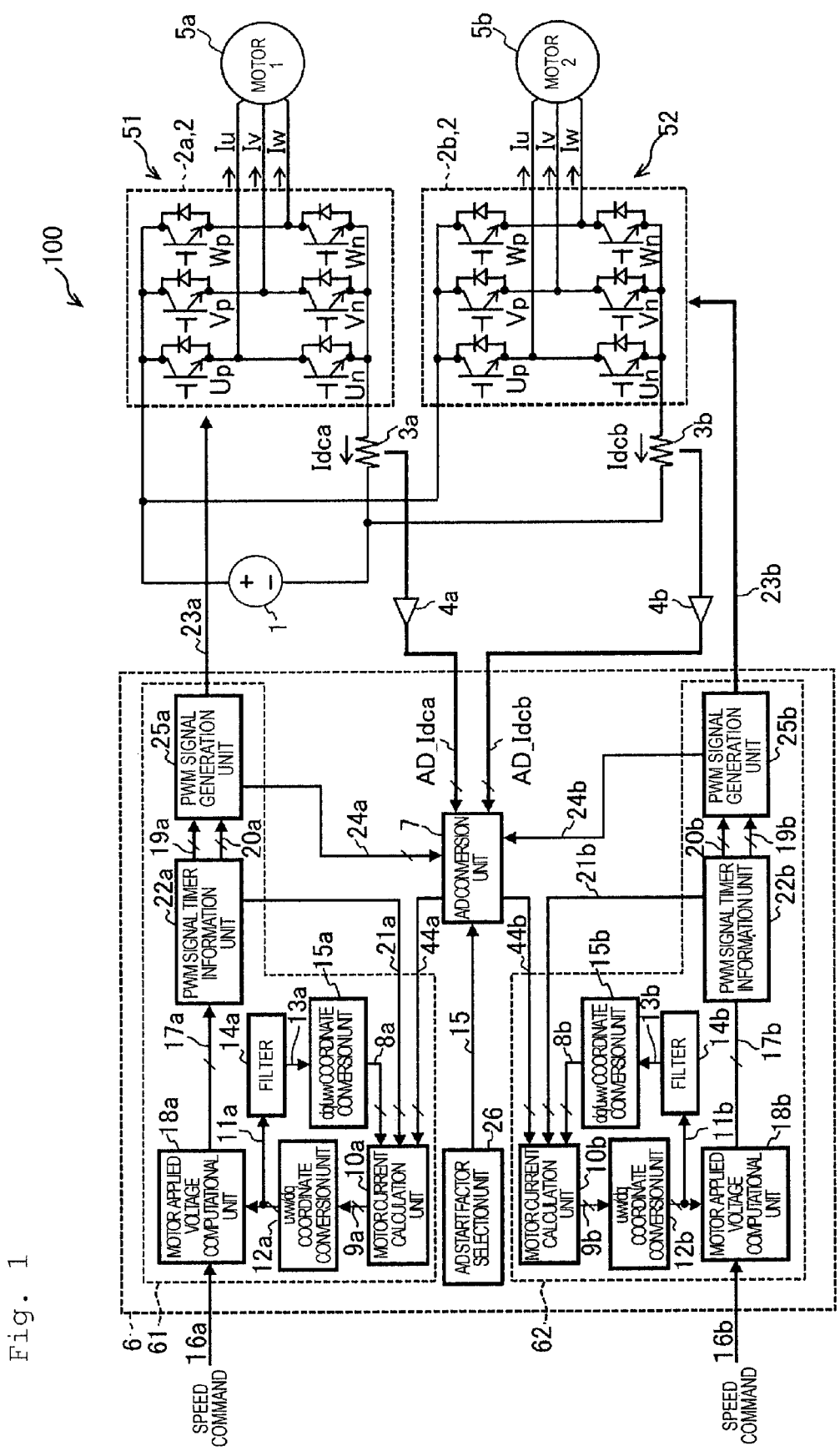
FIG. 1 is a block diagram illustrating the configuration of an inverter control apparatus of a first embodiment of the present invention.

FIG. 1 is a block diagram illustrating the configuration of an inverter control apparatus of a first embodiment of the present invention. The same reference signs are assigned to the same or like configuration elements in the drawings, and duplicated description is omitted.

As illustrated in FIG. 1, an inverter control apparatus 100 includes a direct current power supply 1 that supplies direct current power; a first inverter unit 51; a second inverter unit 52; and a controller (inverter control unit) 6 capable of individually controlling a brushless DC motor (first motor) 5a and a brushless DC motor (second motor) 5b.

<First Inverter Unit and Second Inverter Unit>

The first inverter unit (first inverter circuit) 51 includes a first inverter circuit 2a that converts direct current power from the direct current power supply 1 into alternating current power; a shunt resistor 3a that is provided on a direct current side of the first inverter circuit 2a; a voltage amplifier circuit 4a that amplifies a voltage between both ends of the shunt resistor 3a; and the brushless DC motor 5a connected to the first inverter circuit 2a.

The second inverter unit (second inverter circuit) 52 includes a second inverter circuit 2b that converts direct current power from the direct current power supply 1 into alternating current power; a shunt resistor 3b that is provided on a direct current side of the second inverter circuit 2b; a voltage amplifier circuit 4b that amplifies a voltage between both ends of the shunt resistor 3b; and the brushless DC motor 5b connected to the second inverter circuit 2b.

The direct current power supply 1 includes a rectifying and smoothing circuit that rectifies power from a battery or an alternating current power supply and charges an electrolytic capacitor with rectified power.

The first inverter circuit 2a and the second inverter circuit 2b have the same circuit configuration, and are collectively referred to as an inverter circuit 2. In the inverter circuit 2, three pairs of semiconductor switching elements connected in series to each other are connected to a positive polarity and a negative polarity of the direct current power supply 1. Positive polarity side upper arms of the semiconductor switching elements are UP, VP, and WP, and negative polarity side lower arms are UN, VN, and WN. Multiple switching elements respectively correspond to semiconductor power elements Up, Un, Vp, Vn, Wp, and Wn. Each of the semiconductor switching elements includes an insulated gate bipolar transistor (IGBT) or a metal-oxide-semiconductor field-effect transistor (MOS-FET) and the like.

<Controller>

The controller 6 includes a one-chip microcomputer, and controls the entirety of the inverter control apparatus 100.

The controller 6 includes a first inverter control unit 61 that controls the first inverter unit 51; a second inverter control unit 62 that controls the second inverter unit 52; an A/D conversion unit 7; and an A/D start factor selection unit 26 that switches a start (trigger) factor for the A/D conversion unit 7.

<A/D Conversion Unit>

The A/D conversion unit 7 converts a direct current detection signal AD_Idca obtained by amplifying the voltage of the first shunt resistor 3a, and a direct current detection signal AD_Idcb obtained by amplifying the voltage of the second shunt resistor 3b, into digital signals.

If the A/D conversion unit 7 receives one start trigger of either A/D converter start triggers 24a or 24b (to be described later) which is selected as an A/D start factor by the A/D start factor selection unit 26, the A/D conversion unit converts direct current detection signals into digital signals.

<First Inverter Control Unit>

The first inverter control unit 61 includes a motor current calculation unit 10a that outputs a three-phase motor current detection value 9a of the brushless DC motor 5a based on a digital conversion result 44a from the A/D conversion unit 7 and an estimated three-phase motor current value 8a; an uvw/dq coordinate conversion unit 12a that converts the three-phase motor current detection value 9a into d/q axis current 11a in a coordinate system; a filter 14a that outputs an average value 13a of d/q axis current obtained by removing noise components from the d/q axis current 11a; and a dq/uvw coordinate conversion unit 15a that computes the estimated three-phase motor current value 8a from the average value 13a of the d/q axis current. The first inverter control unit 61 further includes a motor applied voltage computational unit 18a that outputs three-phase motor applied voltage information 17a regarding a voltage from the d/q axis current 11a, a speed command 16a, and a d/q axis current command, which is applied to the brushless DC motor 5a such that the d/q axis current command coincides with the d/q axis current 11a; a PWM signal timer information unit 22a that outputs PWM signal generation information 19a, A/D converter start timing information 20a, and energization pattern information 21a based on the three-phase motor applied voltage information 17a; and a PWM signal generation unit 25a that generates a PWM signal 23a for driving each of the semiconductor switching elements of the inverter 2a from the PWM signal generation information 19a, and generates an A/D converter start trigger (first trigger) 24a from the A/D converter start timing information 20a.

Particularly, the first inverter control unit 61 generates the A/D converter start trigger (first trigger) 24a which starts the A/D conversion unit 7, based on the A/D converter start timing information 20a and a first carrier signal (refer to FIG. 4 to be described later) of the A/D conversion unit 7 (refer to description of an operation in FIG. 4 which will be given later).

Figure 5:
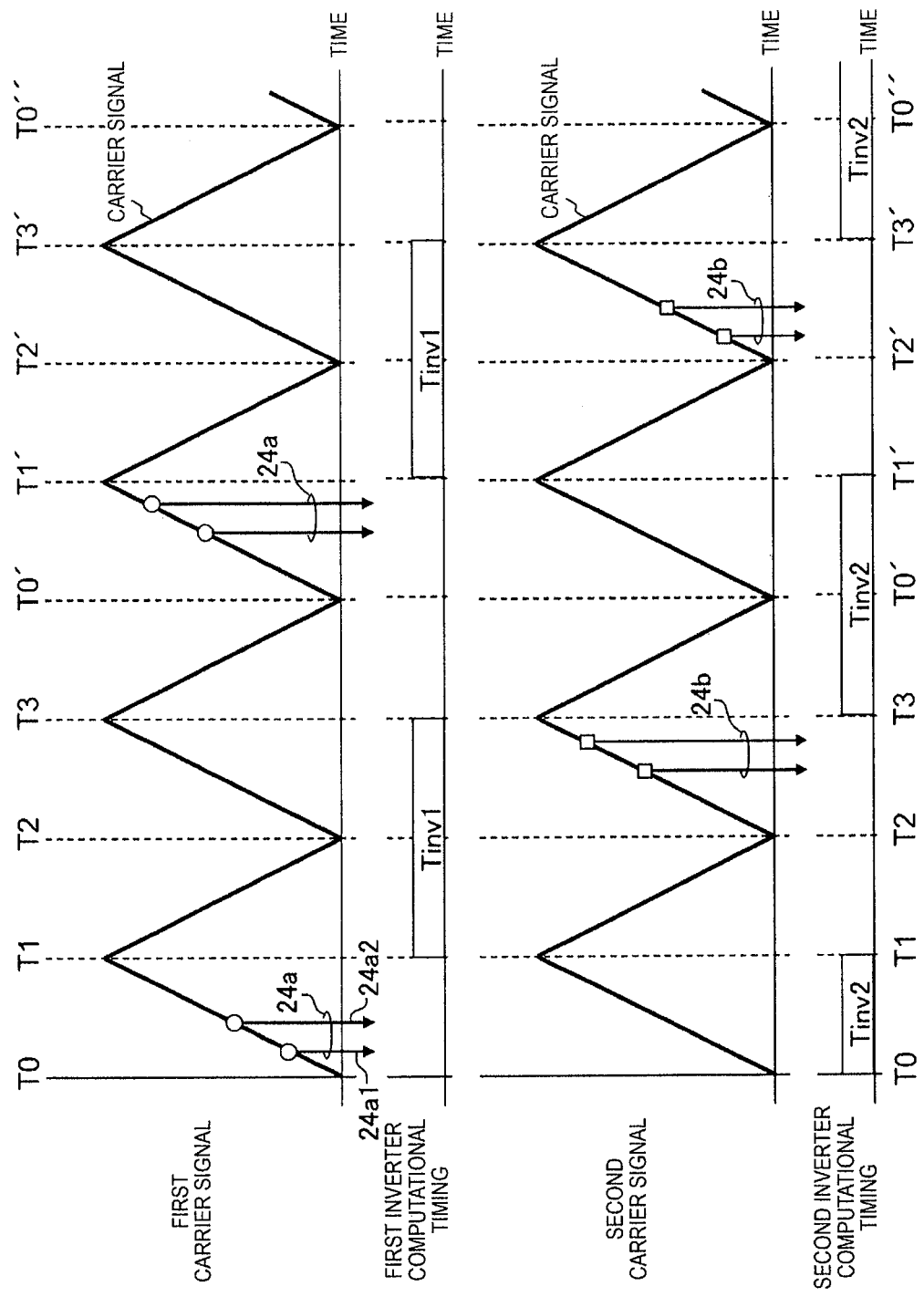
FIG. 5 is a timing chart illustrating first and second carrier signals, A/D converter start triggers, and computational timings of first and second inverter control units in the inverter control apparatus of the first embodiment.

The first inverter control unit 61 generates the A/D converter start trigger (first trigger) 24a based on the first carrier signal (refer to FIG. 5 to be described later) of a first period obtained by dividing a period timing, and performs inverter control computation of the first inverter unit 51 using a period other than the first period based on a conversion result from the A/D conversion unit 7 started by the A/D converter start trigger 24a (refer to description of an operation in FIG. 5 which will be described later).

<Second Inverter Control Unit>

The second inverter control unit 62 includes a motor current calculation unit 10b that outputs a three-phase motor current detection value 9b of the brushless DC motor 5b based on a digital conversion result 44b from the A/D conversion unit 7 and an estimated three-phase motor current value 8b; an uvw/dq coordinate conversion unit 12b that converts the three-phase motor current detection value 9b into d/q axis current 11b in a coordinate system; a filter 14b that outputs an average value 13b of d/q axis current obtained by removing noise components from the d/q axis current 11b; and a dq/uvw coordinate conversion unit 15b that computes the estimated three-phase motor current value 8b from the average value 13b of the d/q axis current. The second inverter control unit 62 further includes a motor applied voltage computational unit 18b that outputs three-phase motor applied voltage information 17b regarding a voltage from the d/q axis current 11b, a speed command 16b, and a d/q axis current command, which is applied to the brushless DC motor 5b such that the d/q axis current command coincides with the d/q axis current 11b; a PWM signal timer information unit 22b that outputs PWM signal generation information 19b, A/D converter start timing information 20b, and energization pattern information 21b based on the three-phase motor applied voltage information 17b; and a PWM signal generation unit 25b that generates a PWM signal 23b for driving each of the semiconductor switching elements of the inverter 2b from the PWM signal generation information 19b, and generates an A/D converter start trigger (second trigger) 24b from the A/D converter start timing information 20b.

Particularly, the second inverter control unit 62 generates the A/D converter start trigger 24b which starts the A/D conversion unit 7, based on the A/D converter start timing information 20b and a second carrier signal (refer to FIG. 4 to be described later) of the A/D conversion unit 7.

The second inverter control unit 62 generates the A/D converter start trigger (second trigger) 24b based on the second carrier signal (refer to FIG. 5 to be described later) of a second period obtained by dividing the period timing, and performs inverter control computation of the second inverter unit 52 using a period other than the second period based on a conversion result from the A/D conversion unit 7 started by the A/D converter start trigger 24b (refer to description of the operation in FIG. 5 which will be described later).

The first inverter control unit 61 and the second inverter control unit 62 perform computation synchronously with the PWM signal generation units 25a and 25b.

The PWM signal generation units 25a and 25b have carrier signals which are generated by counting up and down clock pulses in a PWM carrier period, clock pulses (not shown) having an equivalent or shorter cyclic period than the carrier signals (half period of the carrier signals). The PWM signal generation units 25a and 25b generate the PWM signals 23a and 23b by comparing items of the PWM signal generation information 19a and 19b with the carrier signals, and the A/D converter start triggers 24a and 24b by comparing items of the A/D converter start timing information 20a and 20b with the carrier signals.

The first inverter control unit 61 generates the A/D converter start trigger (first trigger) 24a based on the first carrier signal (refer to FIG. 7 to be described later) of the first period obtained by dividing the period timing. The second inverter control unit 62 generates the A/D converter start trigger (second trigger) 24b based on the second carrier signal, the period timing of which is divided and which corresponds to a period other than the first period (refer to description of the operation in FIG. 7 which will be described later).

<A/D Start Factor Selection Unit>

The A/D start factor selection unit 26 selects an A/D start factor in correspondence with a predetermined period timing of an operation period of the first carrier signal and the second carrier signal, and changes the setting of the A/D conversion unit 7. Computational timings of the first inverter control unit 61 and the second inverter control unit 62 are also determined at predetermined period timings of the operation period of the first carrier signal and the second carrier signal, which will be described later.

Figure 2:
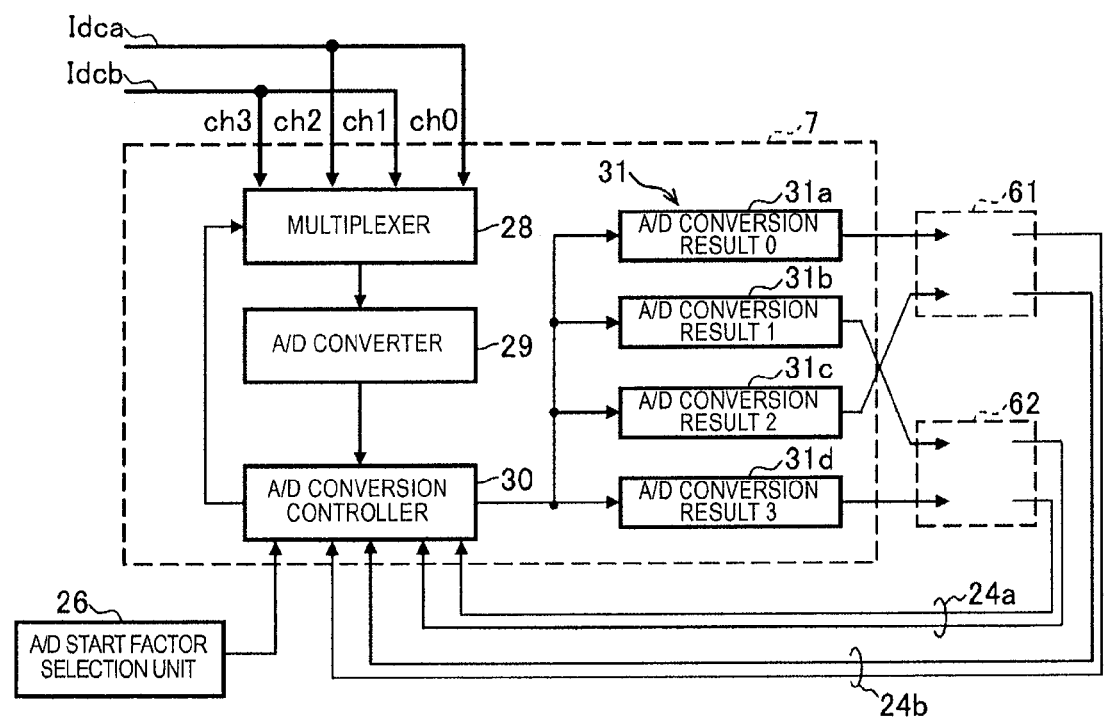
FIG. 2 is a block diagram illustrating the circuit configuration of an A/D conversion unit of the inverter control apparatus of the first embodiment.

FIG. 2 is a block diagram illustrating the circuit configuration of the A/D conversion unit 7.

As illustrated in FIG. 2, the A/D conversion unit 7 includes a multiplexer 28; an A/D converter 29; an A/D conversion controller 30; and an A/D conversion result register 31.

The direct current detection signal AD_Idca (refer to FIG. 1) is branched, and the branched direct current detection signals AD_Idca are input into channels ch0 and ch2 of the multiplexer 28. The direct current detection signal AD_Idcb (refer to FIG. 1) is branched, and the branched direct current detection signals AD_Idcb are input into channels ch1 and ch3. The multiplexer 28 switches between the input direct current detection signal AD_Idca and the input direct current detection signal AD_Idcb in the sequence of the channels ch0 and ch1. The inverter control apparatus 100 uses the A/D conversion unit 7 with two channels for one motor. The inverter control apparatus 100 is capable of controlling two motors (the brushless DC motors 5a and 5b) using the channels ch0 to ch3 (four channels) illustrated in FIG. 2.

The A/D converter 29 converts an analog signal, which is output from the multiplexer 28, into a digital signal.

The A/D conversion controller 30 operates a channel to be connected to the A/D converter 29 by outputting a switching signal (not illustrated) to the multiplexer 28, and stores a digital conversion result in the A/D conversion result register 31.

The A/D conversion controller 30 receives the A/D converter start trigger 24a or 24b, and sequentially performs digital conversion of signals input into the channels ch0 and ch1. Subsequently, the A/D conversion controller 30 receives the A/D converter start trigger 24a or 24b, and sequentially performs digital conversion of signals input into the channels ch2 and ch3. The inputs into the channels ch0 to ch3 are respectively stored in A/D conversion result registers 31a to 31d.

The A/D conversion result register 31 includes the A/D conversion result register 31a storing an A/D conversion result 0 that is a digital result into which an analog signal input into the channel ch0 is converted; the A/D conversion result register 31b storing an A/D conversion result 1 that is a digital result into which an analog signal input into the channel ch1 is converted; the A/D conversion result register 31c storing an A/D conversion result 2 that is a digital result into which an analog signal input into the channel ch2 is converted; and the A/D conversion result register 31d storing an A/D conversion result 3 that is a digital result into which an analog signal input into the channel ch3 is converted.

After analog signals input into the channels ch0 and ch2 are converted into digital signals, analog signals of second direct current Idcb input into the channels ch1 and ch3 are converted into digital signals required by the second inverter control unit 62. The A/D converter start trigger 24b may be set while the A/D converter start timing information 20a also takes into consideration delays in A/D conversion time of first channels ch0 and ch2 so as to obtain current information regarding the current Idcb required by the second inverter control unit 62.

Hereinafter, the operation of the inverter control apparatus 100 with the aforementioned configuration will be described.

Since the first inverter control unit 61 and the second inverter control unit 62 (refer to FIG. 1) have the same configuration, the first inverter control unit 61 will be described as an example.

Figure 3:
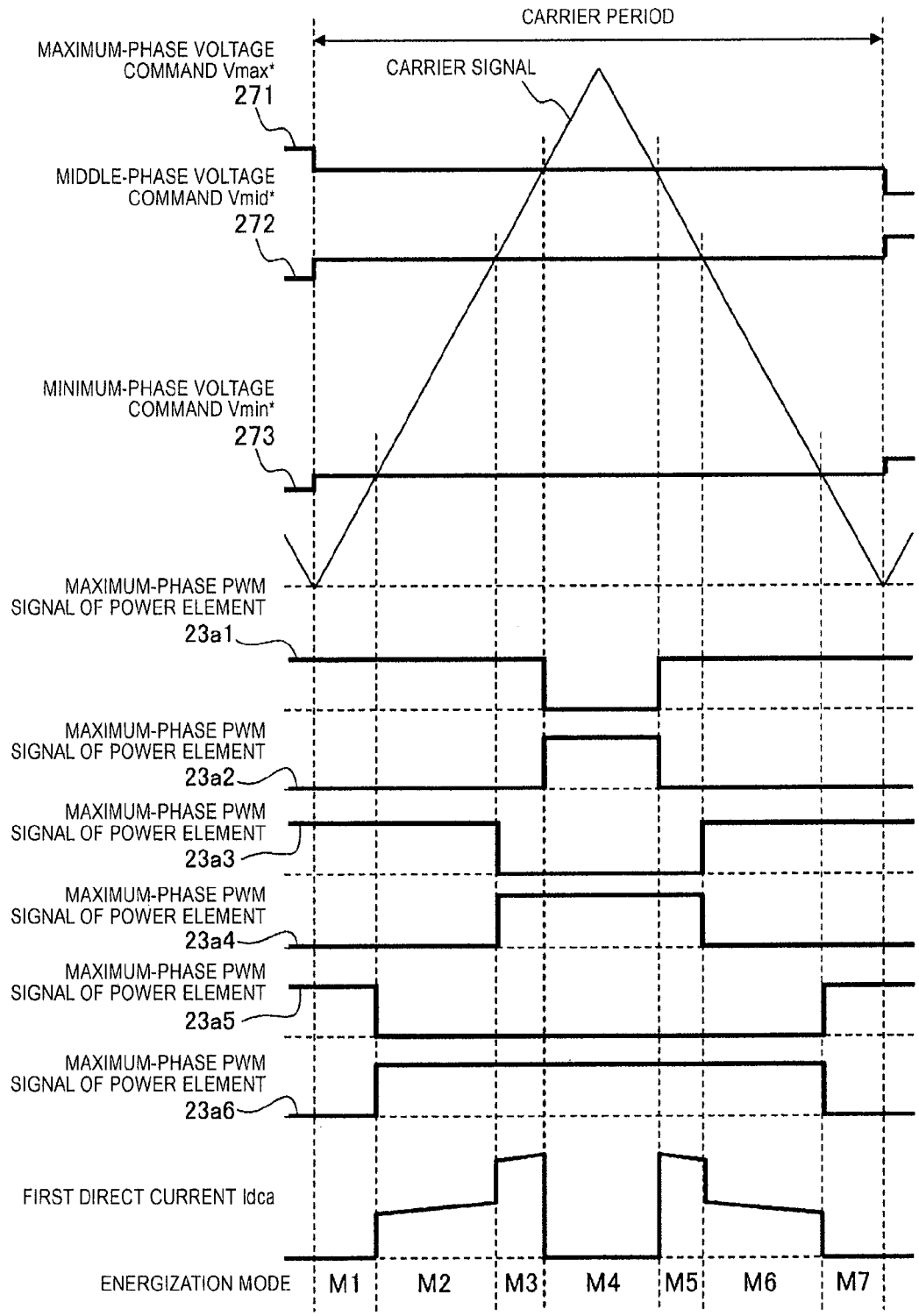
FIG. 3 is a timing chart illustrating the operation of direct current and a PWM signal generation unit of the inverter control apparatus of the first embodiment.

FIG. 3 is a timing chart illustrating the operation of the PWM signal generation unit and direct current. FIG. 3 illustrates a relationship between a carrier signal of the PWM signal generation unit 25a, the PWM signal generation information 19a, an energization pattern of the inverter circuit 2a, and first direct current Idca in the first inverter control unit 61 in one period of the carrier signal.

The PWM signal generation unit 25a of the first inverter control unit 61 illustrated in FIG. 1 outputs a carrier signal to the first inverter circuit 2a. As illustrated in FIG. 3, counting up and down of the aforementioned carrier signal is periodically repeated in half periods (carrier half periods) of the carrier period.

The PWM signal timer information unit 22a illustrated in FIG. 1 generates and outputs the PWM signal generation information 19a to the PWM signal generation unit 25a. The PWM signal generation information 19a illustrated in FIG. 1 is equivalent to three-phase voltage command information obtained by converting three-phase applied voltage information regarding U-, V-, and W-phase applied voltages into time data. Among the three phases, a phase, the voltage command value of which is maximum is referred to as a maximum phase, a phase, the voltage command value of which is minimum is referred to as a minimum phase, and a phase, the voltage command value of which is middle is referred to as a middle phase. Voltage command values 271, 272, and 273 respectively represent a maximum-phase voltage command value Vmax* which is a voltage command value of the maximum phase, a middle-phase voltage command value Vmid* which is a voltage command value of the middle phase, and a minimum-phase voltage command value Vmin* which is a voltage command value of the minimum phase.

The PWM signal generation unit 25a illustrated in FIG. 1 compares the voltage command values 271 to 273 (refer to FIG. 3) with the aforementioned carrier signal, and generates and outputs the PWM signal 23a (refer to FIG. 1) as a result. The PWM signal 23a represents one level of a high level (Hi) and a low level (Lo). Hi represents a turn-on of a semiconductor switching element, and Lo represents a turn-off of a semiconductor switching element. If the maximum-phase voltage command value Vmax*, that is, the voltage command value 271 is higher than the value of the carrier signal, as illustrated in FIG. 3, the PWM signal generation unit 25a sets a PWM signal 23a1 to Hi, and a PWM signal 23a2 to Lo. PWM signals 23a3 and 23a6 are respectively set in a similar manner based on the middle-phase voltage command value Vmid* and the minimum-phase voltage command value Vmin* 273. The PWM signals 23a1, 23a3, 23a5 illustrated in FIG. 3 respectively represent upper arm signals of the phases, and the PWM signals 23a2, 23a4, and 23a6 respectively represent lower arm signals of the phases.

The first inverter circuit 2a (refer to FIG. 1) makes transition in the sequence of energization modes M1, M2, M3, M4, M5, M6, and M7 illustrated in FIG. 3 in correspondence with a combination of the levels of the PWM signals 23a1 to 23a6. In description to be given herein, the U phase, the V phase, and the W phase are respectively assumed to be the maximum phase, the middle phase, and the minimum phase.

In the energization modes M1, M4, and M7, all the upper arms or all the lower arms are turned on, and the first direct current Idca (refer to FIG. 1) does not flow through the shunt resistor 3a (refer to FIG. 1). Since, in the energization modes M2 and M6, the upper arm of the U phase which is the maximum phase is turned on, the upper arm of the V phase which is the middle phase is turned on, and the lower arm of the W phase which is the minimum phase is turned on, the first direct current Idca equivalent to inversion of minimum-phase current Iw flows through the shunt resistor 3a. Since, in the energization modes M3 and M5, only the upper arm of the U phase which is the maximum phase is turned on, the lower arm of the V phase which is the middle phase is turned on, and the lower arm of the W phase which is the minimum phase is turned on, the direct current Idca equivalent to U-phase current Iu flows through the shunt resistor 3a.

The PWM signal timer information unit 22a (refer to FIG. 1) outputs the energization pattern information 21a (refer to FIG. 1) corresponding to a timing at which only the upper arm of the maximum phase is turned on and a timing at which only the lower arm of the minimum phase is turned on in the energization modes described above, and outputs the A/D converter start timing information 20a (refer to FIG. 1). The energization pattern information 21a represents which phases are the maximum phase and the minimum phase in the PWM signal generation information which is output. The A/D converter start timing information 20a is output as time data corresponding to the timings of switching of six phases. In FIG. 3, the energization pattern information 21a obtains the A/D converter start timing information 20a which takes into consideration that the maximum phase is the U phase, the minimum phase is the W phase, and only the lower arm of the minimum phase is turned on in a time period of t1 to t2 (not illustrated), and the A/D converter start timing information 20a which takes into consideration that only the upper arm of the maximum phase is turned on in a time period of t2 to t3 (not illustrated). It is necessary to set the A/D converter start timing information 20a while taking into consideration a time during which the time of attenuation of ringings which occur in the first direct current Idca at the turning on and off of the semiconductor switching elements due to stray capacitance or stray inductance caused by A/D conversion start delay times and motor wirings connected to the inverter circuit, and the time required for a digital conversion process.

Figure 4:
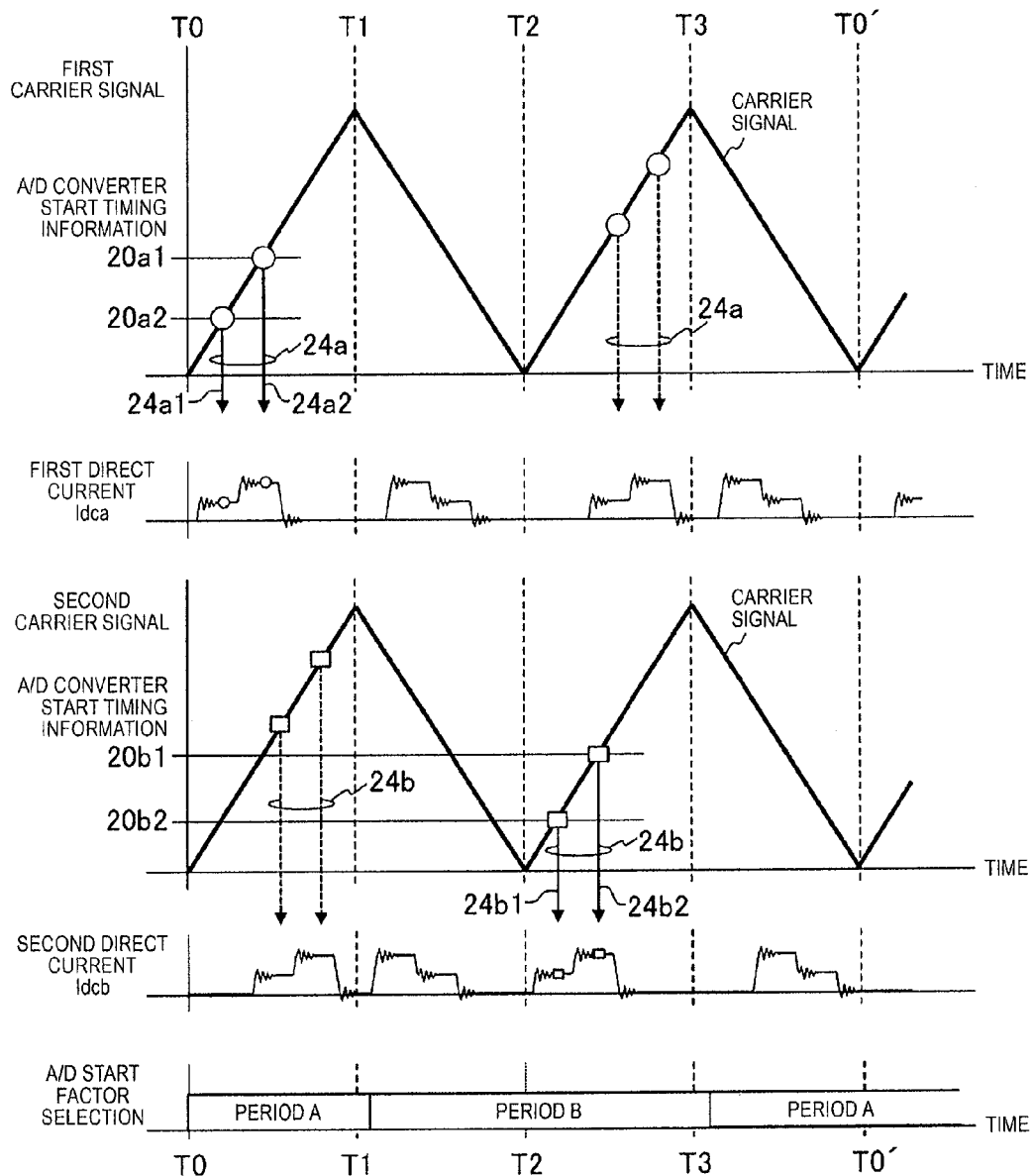
FIG. 4 is a timing chart illustrating operation timings of the A/D conversion unit of the inverter control apparatus of the first embodiment.

FIG. 4 is a timing chart illustrating operation timings of the A/D conversion unit 7 illustrated in FIG. 2. In FIG. 4, a carrier signal (second carrier signal) of the second inverter control unit 62 (refer to FIG. 1) and the second direct current Idcb are illustrated with respect to a time axis in conjunction with a relationship between a carrier signal (first carrier signal) and the first direct current Idca.

The first carrier signal and the second carrier signal are set to be synchronously operated such that counting up and down of the first carrier signal substantially coincides with that of the second carrier signal.

As illustrated in FIG. 4, the first direct current Idca changes synchronously with the first carrier signal, and the second direct current Idcb changes synchronously with the second carrier signal. A/D converter start triggers 24a1 and 24a2 (refer to circular marks in FIG. 4) are generated at timings when the first carrier signal coincides with items of A/D converter start timing information 20a1 and 20a2. As illustrated in FIG. 4, ringings are superimposed on each other in the first direct current Idca and the second direct current Idcb due to the turning on and off of the semiconductor switching elements. The A/D converter start triggers 24a1 and 24a2 are set at timings at which effects of the ringings are avoided.

If the A/D conversion unit 7 (refer to FIG. 2) receives the A/D converter start triggers 24a1 and 24a2, the A/D conversion unit 7 converts the first direct current Idca into digital data in a total of two times at the timings of receipt (refer to solid line arrows of the circular marks in FIG. 4).

Similarly, as illustrated in FIG. 4, A/D converter start triggers 24b1 and 24b2 (refer to rectangular marks in FIG. 4) are generated at timings when the second carrier signal coincides with items of A/D converter start timing information 20b1 and 20b2. If the A/D conversion unit 7 receives the A/D converter start triggers 24b1 and 24b2, the A/D conversion unit 7 converts the second direct current Idcb into digital data in a total of two times at the timings of receipt (refer to solid line arrows of the rectangular marks in FIG. 4).

As described above, counting up and down of the first carrier signal and the second carrier signal is repeated one time or multiple times (two times in an example of FIG. 4) in a half period of the carrier signals. The first carrier signal and the second carrier signal are synchronously operated such that counting up and down of the first carrier signal substantially coincide with that of the second carrier signal. The period timing is divided by switchover between counting up and counting down. In an example of the first carrier signal illustrated in FIG. 4, a period timing of T0 to T0' is divided into T0 to T1, T1 to T2, T2 to T3, and T3 to T0' by switchover between counting up and counting down of the carrier signal.

In the example of FIG. 4, the first inverter control unit 61 illustrated in FIG. 1 generates the A/D converter start trigger 24a (24a1 and 24a2) that starts the A/D conversion unit 7 in T0 to T1 out of a carrier half period timing of T0 to T0'. In contrast, the second inverter control unit 62 illustrated in FIG. 1 generates the A/D converter start trigger 24b (24b1 and 24b2) that starts the A/D conversion unit 7 in T2 to T3. More specifically, the second inverter control unit 62 generates the A/D converter start trigger 24b (24b1 and 24b2) at the same timings as those of the first inverter control unit 61; however, since the A/D start factor selection unit 26 (to be described later) enables a setting to prohibit receipt of the A/D converter start trigger 24b, the A/D converter start triggers 24b1 and 24b2 are not transmitted to the A/D conversion unit 7 in T0 to T1, which will be described later.

In contrast, the first inverter control unit 61 generates the A/D converter start trigger 24a (24a1 and 24a2) in T2 to T3; however, since the A/D start factor selection unit 26 enables a setting to prohibit receipt of the A/D converter start trigger 24a, the A/D converter start triggers 24a1 and 24a2 are not transmitted to the A/D conversion unit 7 in T2 to T3, and the A/D converter start trigger 24b (24b1 and 24b2) of the second inverter control unit 62 is input thereinto. Accordingly, as illustrated in FIG. 4, the A/D converter start trigger 24a (24a1 and 24a2) is generated in T0 to T1 based on the first carrier signal, and the A/D converter start trigger 24b (24b1 and 24b2) is generated in T2 to T3 based on the second carrier signal. The A/D conversion unit 7 alternately receives the A/D converter start trigger 24a (24a1 and 24a2) and the A/D converter start trigger 24b (24b1 and 24b2) as a trigger. As a result, one A/D conversion unit 7 is capable of converting current of the first inverter control unit 61 and current of the second inverter control unit 62 into digital data.

A/D start factor selection performed by the A/D start factor selection unit 26 (refer to FIG. 1) will be described with reference to FIG. 4.

As illustrated in FIG. 4, the carrier half period timing is T0 to T3, and T0' to T3' is repeated again after T3.

The A/D start factor selection unit 26 (refer to FIG. 1) changes a setting for receipt of a trigger by the A/D conversion unit 7 (refer to FIG. 2) to a setting (refer to dotted line arrows of circular marks in FIG. 4) to prohibit receipt of A/D converter start trigger 24a from the first carrier signal at a timing T1 after digital conversion of the first direct current Idca is complete. The A/D start factor selection unit 26 changes a setting for receipt of a trigger to a setting (refer to solid line arrows of rectangular marks in FIG. 4) to receive the A/D converter start trigger 24b from the second carrier signal. The A/D start factor selection unit 26 enables a setting to receive A/D converter start trigger 24a from the first carrier signal, and changes a setting for receipt of a trigger to a setting to prohibit receipt of the A/D converter start trigger 24b from the second carrier signal at a time T3 after digital conversion of the second direct current Idcb is complete.

As illustrated in FIG. 4, the A/D start factor selection unit 26 (refer to FIG. 1) alternately switches between a time period A in which the A/D converter start trigger 24a is received and a time period B in which the A/D converter start trigger 24b is received. The first inverter control unit 61 (refer to FIG. 1) and the second inverter control unit 62 are capable of obtaining required motor current information in every two periods of carrier signal due to alternate switching between the period A in which the A/D converter start trigger 24a is received and the period B in which the A/D converter start trigger 24b is received.

FIG. 5 is a timing chart illustrating the first and second carrier signals illustrated in FIG. 4, the A/D converter start triggers 24a and 24b, and computational timings of the first inverter control unit 61 and the second inverter control unit 62.

The first inverter control unit 61 (refer to FIG. 1) updates three-phase motor applied voltage information in a period of T1 to T3 based on A/D converted motor current information. The second inverter control unit 62 (refer to FIG. 1) updates the phases of voltages applied to the three-phase motor by updating three-phase motor applied voltage information in a period of T3 to T1' (not illustrated). That is, each of the inverter control units 61 and 62 performs computation in every two periods of carrier signal.

A first inverter computational timing related to the first carrier signal and the first inverter control unit 61 (refer to FIG. 1) illustrated in FIG. 5 will be described in detail as an example.

The counting up and down of the first carrier signal is periodically repeated in every carrier half period timing of T0 to T3 (T0' to T3'). The A/D conversion unit 7 (refer to FIG. 2) receives the A/D converter start triggers 24a1 and 24a2 when counting up in a timing of T0 to T1 (T0' to T1'), converts the first direct current Idca into digital data, and the digital conversion result in the A/D conversion result register 31 (refer to FIG. 2). That is, after the A/D conversion is performed when counting up in a timing of T0 to T1, the next A/D conversion is performed in a timing of T0' to T1' after the carrier half period. A timing of T0 to T1 (T0' to T1') corresponds to the time period A in which the A/D converter start trigger 24a illustrated in FIG. 4 is received.

The first inverter control unit 61 (refer to FIG. 1) performs first inverter computation in a timing other than a timing of T0 to T1 (T0' to T1'), that is, in T1 to T0' (T1' to T0"). In an example of FIG. 5, a timing of T1 to T3 (T1' to T3') is a first inverter computational timing Tinv1. Specifically, the first inverter computation is computation of a voltage command value based on a stored digital value of the A/D conversion result register 31, into which the detected first direct current Idca is converted. Computation other than the computation of the voltage command value may also be performed in the first inverter computational timing Tinv1.

The A/D start factor selection unit 26 (refer to FIG. 1) obtains the timing of end of the first inverter computation as an approximate value in advance, and switches from the time period A to the time period B at the timing of end of the first inverter computation after waiting for a predetermined lead time period.

As such, A/D conversion of detected current is performed by taking in of the A/D converter start trigger 24a when counting up the first carrier signal in a timing of T0 to T1 (T0' to T1') out of a carrier half period timing of T0 to T3 (T0' to T3'), and the first inverter control unit 61 performs the first inverter computation in subsequent timing of T1 to T0' (T1' to T0"). Thereafter, the same processes are alternately repeated every predetermined timing of the carrier half period.

The first inverter computational timing related to the first carrier signal and the first inverter control unit 61 has been described as an example. Similarly, the aforementioned description applies second inverter computational timing related to the second carrier signal and the second inverter control unit 62 (refer to FIG. 1). That is, the second direct current Idcb, which is detected when the A/D converter start trigger 24b is received during counting up of the second carrier signal in a timing of T2 to T3 (T2' to T3'), is converted into digital data. The second inverter control unit 62 performs the second inverter computation in T3 to T2' (T3' to T2"), that is, the second inverter computational timing Tinv2.

As described above, the controller 6 of the inverter control apparatus 100 includes the A/D conversion unit 7 that performs digital conversion of an input signal when a signal for either the A/D converter start trigger 24a or the A/D converter start trigger 24b is input thereinto; the first inverter control unit 61 that generates the A/D converter start trigger 24a which starts the A/D conversion unit 7, based on the A/D converter start timing information 20a and the first carrier signal; the second inverter control unit 62 that generates the A/D converter start trigger 24b which starts the A/D conversion unit 7, based on the A/D converter start timing information 20b and the second carrier signal; and the A/D start factor selection unit 26 that receives either the A/D converter start trigger 24a or the A/D converter start trigger 24b and selects an A/D start factor at the predetermined period timing of the operation period of the first carrier signal and the second carrier signal.

Even though one A/D conversion unit 7 which starts by receiving one start trigger is provided in this configuration, it is possible to obtain current information required for two inverter controls. That is, the inverter control apparatus 100 is capable of obtaining current information required for inverter control of two or more inverter control units (the first inverter control unit 61 and the second inverter control unit 62 in the embodiment, and three or more inverter control units may be provided) via one A/D conversion unit 7. Accordingly, it is possible to realize an inverter control apparatus in which the number of A/D conversion units installed is reduced or a high-speed (high-cost) A/D conversion unit is not used in comparison with that in the related art. As a result, it is possible to realize an inverter control apparatus capable of variable speed control of the rotational speeds of multiple brushless DC motors individually via a low-cost microcomputer (the controller 6).

In the embodiment, the first inverter control unit 61 of the controller 6 generates the A/D converter start trigger 24a based on the first carrier signal of the first period obtained by dividing the period timing, and performs inverter control computation of the first inverter unit 51 using a period other than the first period based on a conversion result from the A/D conversion unit started by the A/D converter start trigger 24a. Similarly, the second inverter control unit 62 generates the A/D converter start trigger 24b based on the second carrier signal of the second period obtained by dividing the period timing, and performs inverter control computation of the second inverter unit 52 using a period other than the second period based on a conversion result from the A/D conversion unit started by the A/D converter start trigger 24b.

In this configuration, it is possible to alternately use the two inverter controls in PWM periods via the A/D conversion unit 7. Accordingly, it is possible to thin computational timings of each inverter control out to one time in two PWM carrier periods. A margin in CPU computational time is obtained, and it is possible to further speed up the carrier period in comparison with that in a case where thinning out is not performed. As a result, it is possible to obtain an effect of improving controllability and improving an upper limit setting of the carrier period.

Second Embodiment

In a second embodiment, computational timings of inverter control are further thinned out.

Figure 6:
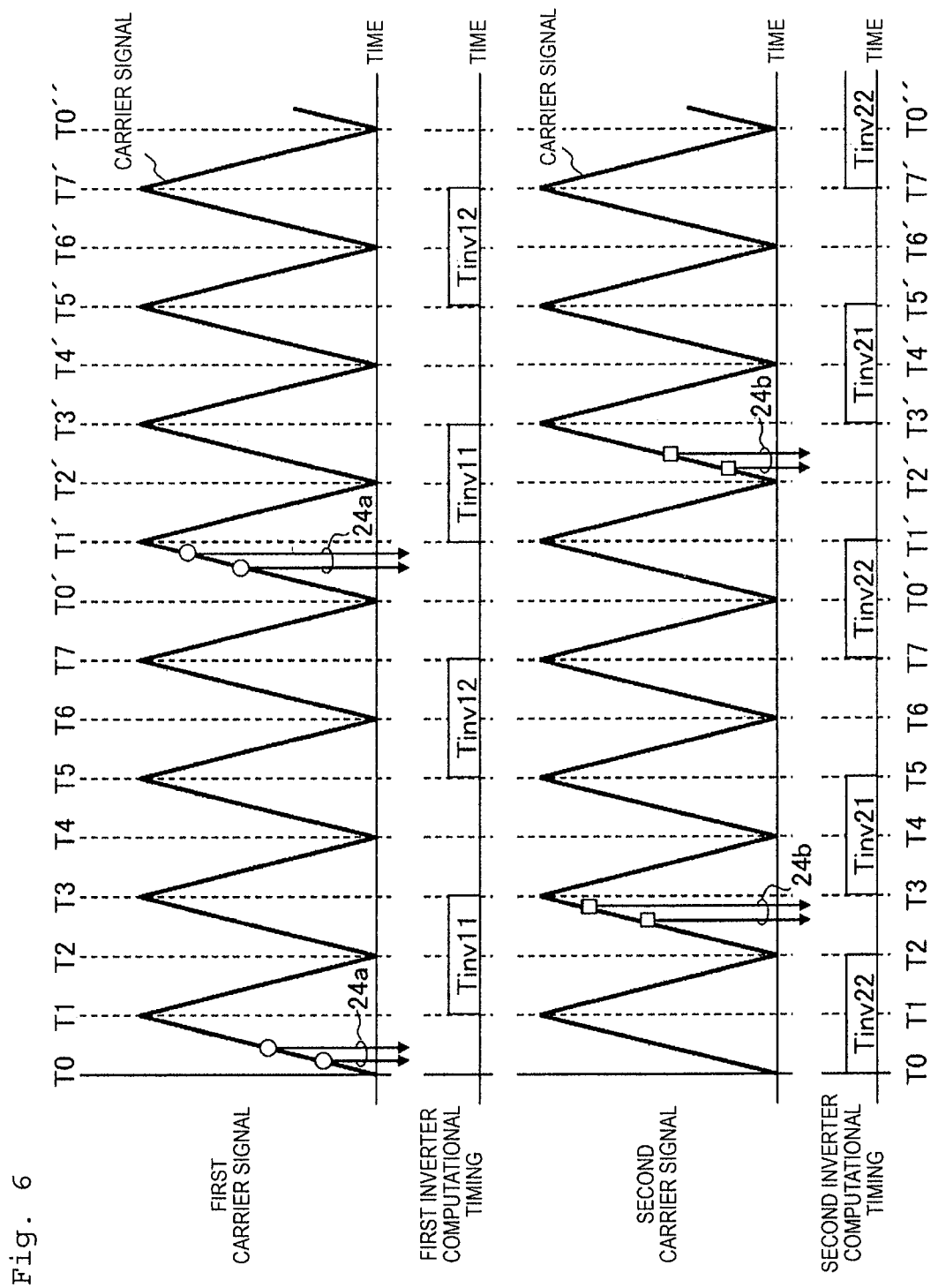
FIG. 6 is a timing chart illustrating first and second carrier signals, A/D converter start triggers, and computational timings of first and second inverter control units in an inverter control apparatus of a second embodiment of the present invention.

FIG. 6 is a timing chart illustrating the first and second carrier signals, the A/D converter start triggers 24a and 24b, and computational timings of the first inverter control unit 61 and the second inverter control unit 62 in an inverter control apparatus of the second embodiment of the present invention.

The configuration of the inverter control apparatus of the second embodiment is the same as that of the inverter control apparatus 100 illustrated in FIG. 1. The A/D start factor selection unit 26 (refer to FIG. 1) performs a setting such that A/D conversion of current, which is detected by taking in of the A/D converter start triggers 24a and 24b, and inverter computation (computation for updating motor applied voltage information based on a current calculation value) are performed one time in four PWM carrier periods. Selection is performed to split the first inverter computation performed by the first inverter control unit 61 into two computations, and to split the second inverter computation performed by the second inverter control unit 62 into two computations.

As illustrated in FIG. 6, in the embodiment, A/D conversion of current, which is detected by taking in of the A/D converter start triggers 24a and 24b, and inverter computation are thinned out to one time in four PWM carrier periods. The first inverter computation which is one computation is split into two computations, and the computations are performed at a first half of first inverter computational timing Tinv11 out of a carrier half period timing of T1 to T0' (T1' to T0"), that is, in T1 to T3 (T1' to T3'), and at a second half of first inverter computational timing Tinv12, that is, in T5 to T7 (T5' to T7'). Similarly, the second inverter computation which is one computation is split into two computations, and the computations are performed at a first half of second inverter computational timing Tinv21 out of a carrier half period timing of T1 to T0' (T1' to T0"), that is, in T3 to T5 (T3' to T5'), and at a second half of first inverter computational timing Tinv22, that is, in T7 to T1' (T7' to T1").

As such, in the embodiment, inverter control computation is split into multiple computations, and the computations are executed in a period other than the first period, and thus, a spare time in CPU computational time is obtained, and it is possible to further improve an upper limit setting of the carrier period.

Third Embodiment

In a third embodiment, computational timings of inverter control occur in every PWM carrier periods.

Figure 7:
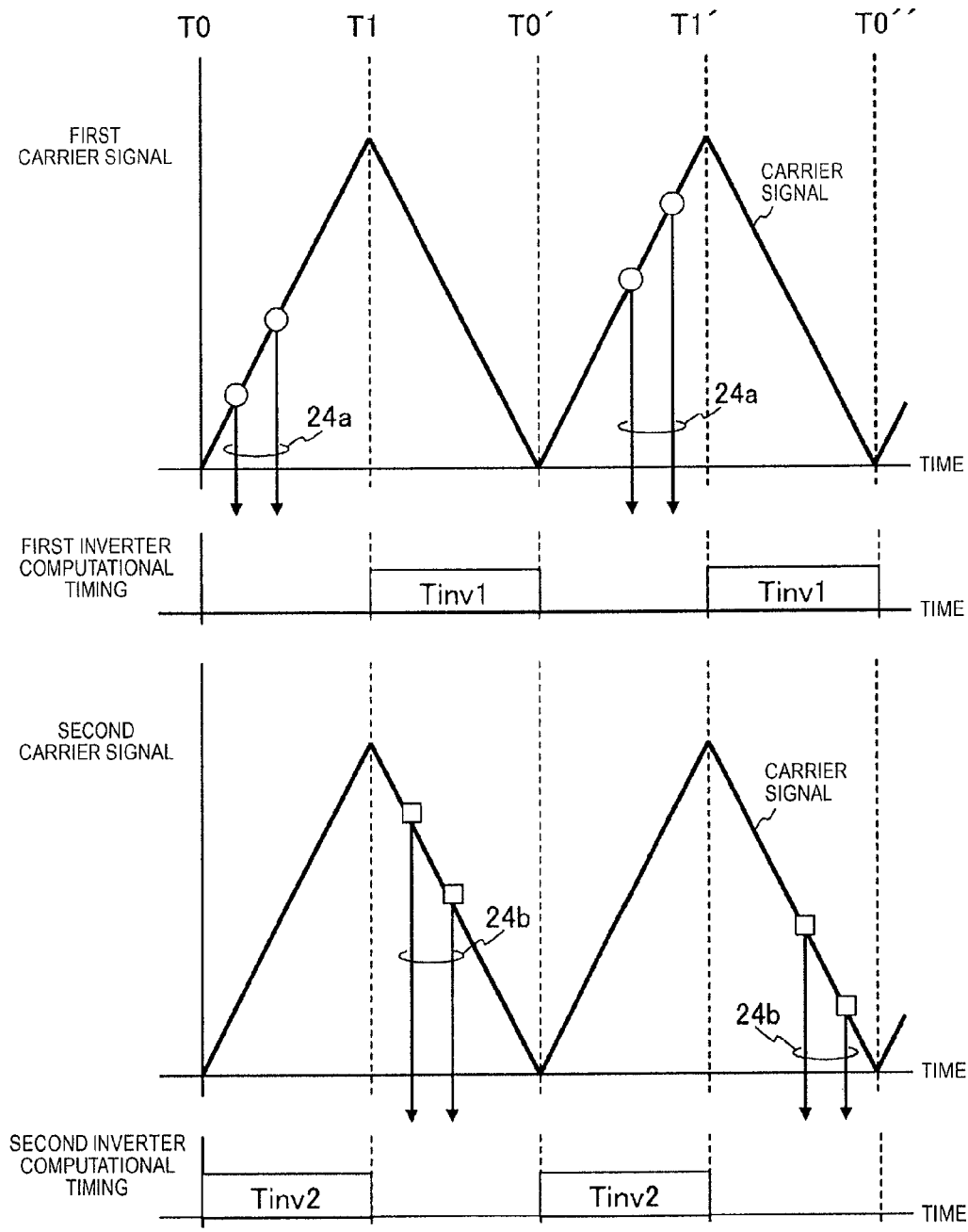
FIG. 7 is a timing chart illustrating first and second carrier signals, A/D converter start triggers, and computational timings of first and second inverter control units in an inverter control apparatus of a third embodiment of the present invention.

FIG. 7 is a timing chart illustrating the first and second carrier signals, the A/D converter start triggers 24a and 24b, and computational timings of the first inverter control unit 61 and the second inverter control unit 62 in an inverter control apparatus of the third embodiment of the present invention.

The configuration of the inverter control apparatus of the third embodiment is the same as that of the inverter control apparatus 100 illustrated in FIG. 1.

As illustrated in FIG. 7, the first inverter control unit 61 performs A/D conversion when counting up the first carrier signal, and performs inverter computation when counting down the first carrier signal. In an example of FIG. 7, the first inverter control unit 61 performs A/D conversion when counting up the first carrier signal in a carrier half period timing of T0 to T1 (T0' to T1'), and performs inverter computation when counting down the carrier signal in a first timing of T1 to T0' (T1' to T0"). The inverter computational timing is Tinv1. Similarly, the second inverter control unit 62 performs A/D conversion when counting down the second carrier signal in a carrier half period timing of T1 to T0' (T1' to T0"), and performs inverter computation when counting up the carrier signal in a second timing of T0 to T1 (T0' to T1'). The inverter computational timing is Tinv2.

The A/D start factor selection unit 26 (refer to FIG. 1) switches a setting for receipt of a trigger by the A/D conversion unit 7 such that the A/D converter start trigger 24b is received at a time T1 after digital conversion of the first direct current Idca is complete. The A/D start factor selection unit 26 performs switching such that the A/D converter start trigger 24a is received at a time T0' after digital conversion of the second direct current Idcb is complete.

The first inverter control unit 61 and the second inverter control unit 62 may exchange the processes when counting up and down the carrier signals.

As such, in the embodiment, the first inverter control unit 61 generates the A/D converter start trigger (first trigger) 24a based on the first carrier signal of the first period obtained by dividing the period timing. The second inverter control unit 62 generates the A/D converter start trigger (second trigger) 24b based on the second carrier signal, the period timing of which is divided and which corresponds to a period other than the first period.

Accordingly, a PWM computational timing is not thinned out in comparison with that in the first embodiment, in addition to obtaining the same effects as those of the first embodiment. Since inverter computation is performed in every PWM carrier periods, it is possible to perform two inverter controls without sacrificing control response characteristics.

Fourth Embodiment

Figure 8:
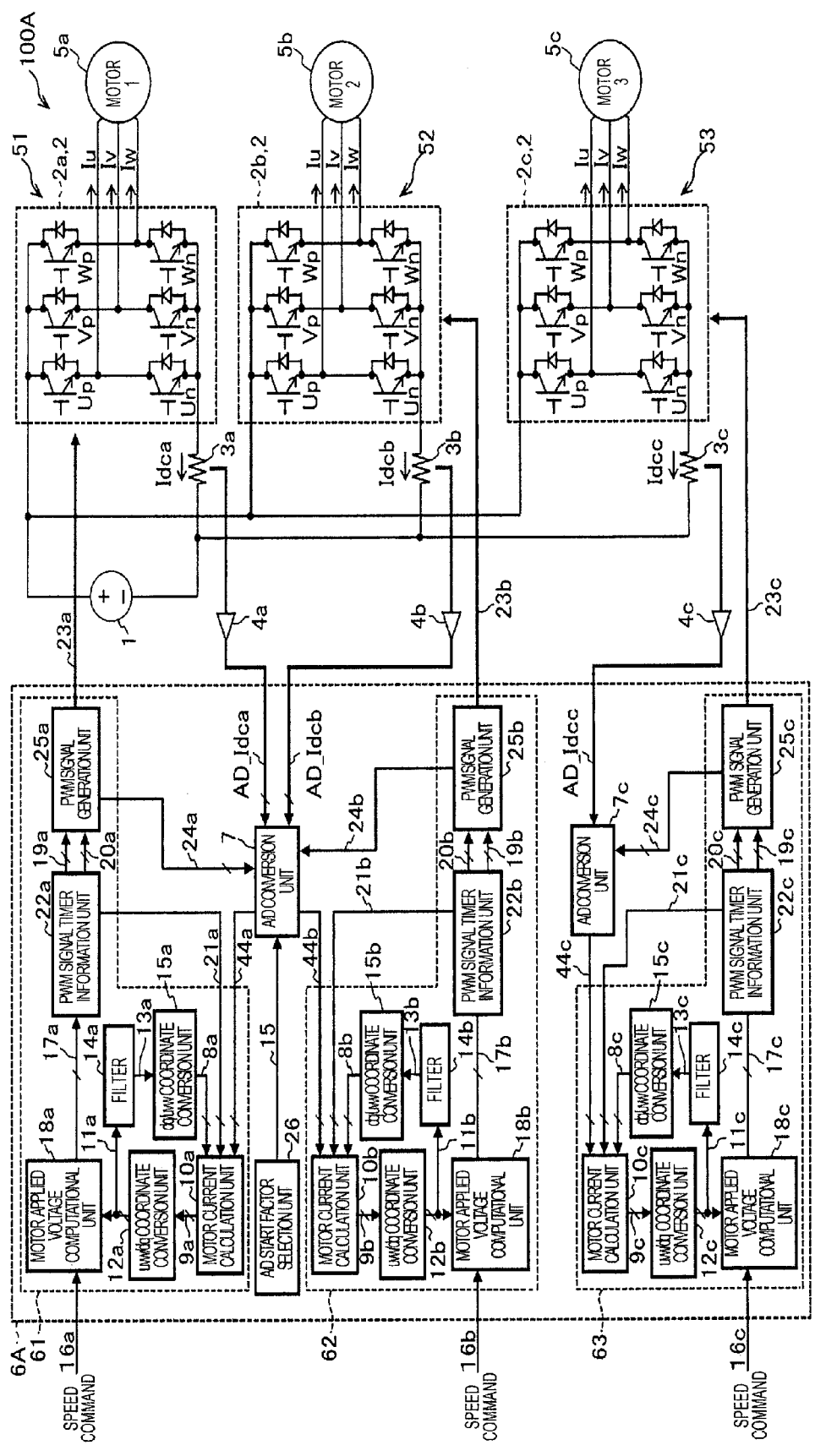
FIG. 8 is a block diagram illustrating the configuration of an inverter control apparatus of a fourth embodiment of the present invention.

FIG. 8 is a block diagram illustrating the configuration of an inverter control apparatus of a fourth embodiment of the present invention. The same reference signs are assigned to the same configuration parts as those in FIG. 1, and duplicated description is omitted.

As illustrated in FIG. 8, an inverter control apparatus 100A includes the direct current power supply 1 that supplies direct current power; the first inverter unit 51; the second inverter unit 52; a third inverter unit 53; and a controller 6A capable of individually controlling the brushless DC motor (first motor) 5a, the brushless DC motor (second motor) 5b, and a brushless DC motor (third motor) 5c.

The third inverter unit 53 includes a third inverter circuit 2c that converts direct current power from the direct current power supply 1 into alternating current power; a shunt resistor 3c that is provided on a direct current side of the third inverter circuit 2c; a voltage amplifier circuit 4c that amplifies a voltage between both ends of the shunt resistor 3c; and the brushless DC motor 5c connected to the third inverter circuit 2c.

The controller 6A includes the first inverter control unit 61 that controls the first inverter unit 51; the second inverter control unit 62 that control the second inverter unit 52; a third inverter control unit 63 that controls the third inverter unit 53; the A/D conversion unit 7; the A/D start factor selection unit 26 that switches a start factor of the A/D conversion unit 7.

The third inverter control unit 63 includes a motor current calculation unit 10c that outputs a three-phase motor current detection value 9c of the brushless DC motor 5c based on a digital conversion result 44c from the A/D conversion unit 7 and an estimated three-phase motor current value 8c; an uvw/dq coordinate conversion unit 12c that converts the three-phase motor current detection value 9c into d/q axis current 11c in a coordinate system; a filter 14c that outputs an average value 13c of d/q axis current obtained by removing noise components from the d/q axis current 11c; and a dq/uvw coordinate conversion unit 15c that computes the estimated three-phase motor current value 8c from the average value 13c of the d/q axis current. The third inverter control unit 63 further includes a motor applied voltage computational unit 18c that outputs three-phase motor applied voltage information 17c regarding a voltage from the d/q axis current 11c, a speed command 16c, and a d/q axis current command, which is applied to the brushless DC motor 5a such that the d/q axis current command coincides with the d/q axis current 11c; a PWM signal timer information unit 22c that outputs PWM signal generation information 19c, A/D converter start timing information 20c, and energization pattern information 21c based on the three-phase motor applied voltage information 17c; and a PWM signal generation unit 25c that generates a PWM signal 23c for driving each of the semiconductor switching elements of the inverter 2c from the PWM signal generation information 19c, and generates an A/D converter start trigger 24c from the A/D converter start timing information 20c.

The controller 6A of the inverter control apparatus 100A includes the third inverter unit 53 in addition to the first inverter unit 51 and the second inverter unit 52. One A/D conversion unit can be used in the third inverter unit 53, and thus, a temperature detection signal or a voltage detection signal for protecting the inverter circuit 2 may be input into an analog signal input into the A/D conversion unit illustrated in FIG. 4.

In the embodiment, it is possible to individually control three brushless DC motors 5a to 5c via one low-cost microcomputer (the controller 6A).

Since the direct current power supply 1 is common to the first to third inverter circuits 51 to 53, and the first to third inverter circuits 51 to 53 are controlled by one microcomputer (the controller 6A), the voltage of the direct current power supply 1 is detected by only one A/D conversion unit 7c. As a result, it is possible to simplify the circuit configuration.

Since all current supplied to the inverter circuits 51 to 53 is obtained via computation, even if means for communication between microcomputers is not used, the direct current power supply 1 can be protected from overcurrent flowing thereto. As a result, it is possible to simplify the circuit configuration.

Fifth Embodiment

Figure 9:
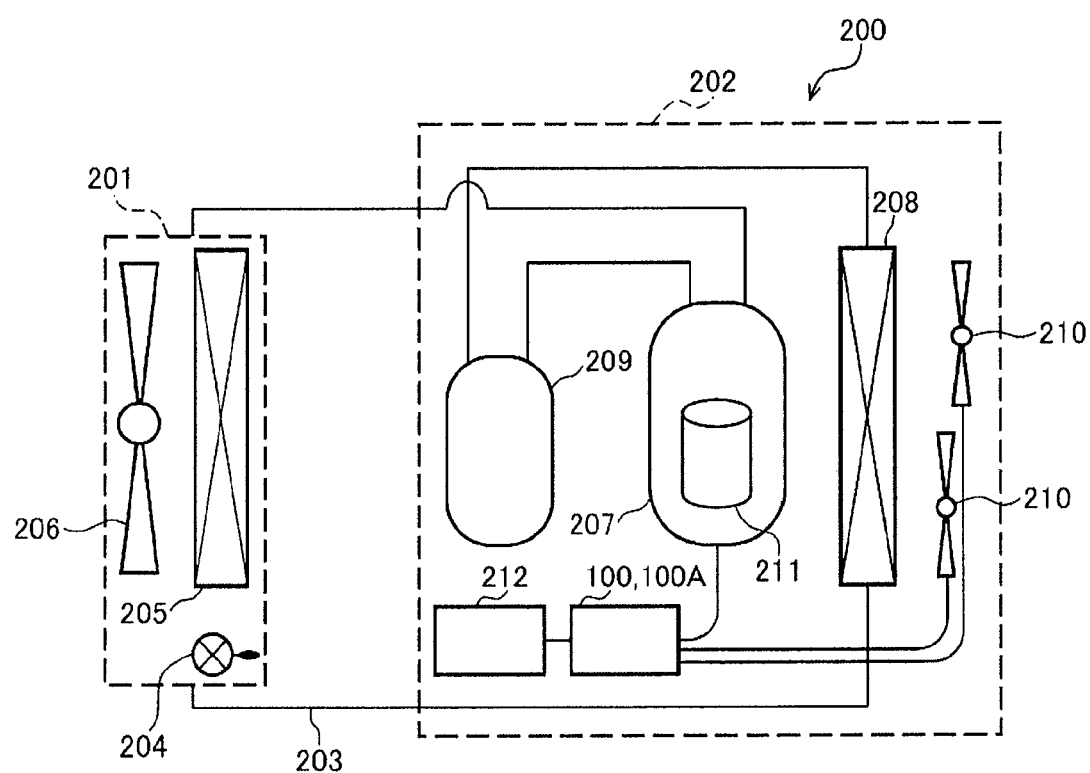
FIG. 9 is a view illustrating the configuration of a refrigerating apparatus including an inverter control apparatus in a fifth embodiment of the present invention.

FIG. 9 is a view illustrating the configuration of a refrigerating apparatus including an inverter control apparatus in a fifth embodiment of the present invention. In the embodiment, a refrigerating apparatus (air conditioner) 200 to which an inverter control apparatus of each embodiment is applied will be described. The refrigerating apparatus 200 is an air conditioner, a refrigerator, or the like.

As illustrated in FIG. 9, the refrigerating apparatus 200 includes an indoor unit 201; an outdoor unit 202; and a pipe 203. The indoor unit 201 and the outdoor unit 202 are connected to the refrigerant pipe 203, and air inside of a room in which the indoor unit 201 is installed is conditioned by a well-known refrigerant cycle.

The indoor unit 201 includes an indoor expansion valve 204; an indoor heat exchanger 205; and a fan motor 206 that blows air against the indoor heat exchanger 205.

The outdoor unit 202 includes a compressor 207; an outdoor heat exchanger 208; an accumulator 209; a fan motor 210 that blows air against the outdoor heat exchanger 208; a brushless DC motor 211 that is disposed inside of the compressor 207, and drives the compressor 207; the inverter control apparatus 100 that drives the brushless DC motor 211; and a host apparatus 212 that communicates with the inverter control apparatus 100.

A refrigerant cycle is formed by connecting together the compressor 207, the outdoor heat exchanger 208, the indoor expansion valve 204, the indoor heat exchanger 205, and the accumulator 209 in the listed sequence, and by circulating refrigerant therethrough.

The inverter control apparatus 100 controls the operational frequency (rotational speed) of the brushless DC motor 211 in correspondence with the capacity of the compressor 207 required for a refrigerant cycle, and individually controls the operational frequencies of the fan motors 210a and 210b. The host apparatus 212 sends an instruction for an operational frequency to the inverter control apparatus 100, 100A. The inverter control apparatus 100 and the host apparatus 212 share an operational state of the inverter control apparatus 100 via communication therebetween. If the inverter control apparatus 100 detects an abnormality, the inverter control apparatus 100 transmits a signal for the detected abnormality to the host apparatus 212, and displays the signal on a display unit (not illustrated) of the host apparatus 212.

The inverter control apparatus 100, 100A may be provided on one substrate, or may be configured such that substrates are separated for the inverter circuits, and are connected together via wirings.

The inverter control apparatus 100, 100A may be used in a pump, a ventilating fan, or the like in addition to a refrigerating apparatus.

The present invention is not limited to the aforementioned embodiments, and includes other modification examples and application examples insofar as the modification examples and the application examples do not depart from the concept of the present invention described in the claims.

The aforementioned embodiments have been described in detail for easy understanding of the present invention, and are not limited to a configuration in which all the elements described are not necessarily provided. A portion of the configuration of an embodiment may be replaced with the configuration of another embodiment. The configuration of an embodiment may be added to the configuration of another embodiment. The addition, deletion, and replacement of another configuration can be made to a portion of the configuration of each embodiment.

A portion of or all the aforementioned configuration elements, functions, processing units, and processing means may be realized by hardware such as an integrated circuit. The aforementioned configuration elements, functions, and the like may be realized by software in such a way that a processor interprets and executes a program for realizing each function. Information such as a program for realizing each function, tables, and files may be stored in a recording device such as a memory or hard disk, or may be stored in a recording medium such as a flash memory card or a digital versatile disk (DVD).

In each embodiment, only control cables or information cables which are considered to be required for description are illustrated, and all the control cables or information cables which should be required for a complete product are not illustrated. It may be considered that, actually, almost all the configuration elements are connected to each other.

As described above, the present invention provides an inverter control apparatus comprising:
inverter circuits configured to convert direct current power into three-phase alternating current power and supply three-phase alternating current power to synchronous motors;
current detection units configured to detect currents flowing through the inverter circuits; and
an inverter control unit configured to determine voltage command values and performs pulse width modulation with the determined voltage command values to supply a pulse width modulation signaled to the synchronous motors based on the detected currents,
wherein the inverter control unit includes
an A/D conversion unit that converts the detected currents into digital data;
a first inverter control unit that generates a first trigger which starts A/D conversion in the A/D conversion unit, based on a first carrier signal used in the pulse width modulation and start timing information of the A/D conversion unit indicating a predetermined period of the first carrier signal;
a second inverter control unit that generates a second trigger which starts conversion of the A/D conversion unit, based on a second carrier signal used in the pulse width modulation and start timing information of the A/D conversion unit indicating a predetermined period of the second carrier signal; and an A/D start factor selection unit that receives the first trigger and the second trigger, selects an A/D start factor in predetermined periods of cycles of the first carrier signal and the second carrier signal, and causes the AD conversion unit to perform the A/D conversion of the detected current, wherein the inverter control unit supplies the pulse modulation signal to one of the inverter circuits corresponding to the A/D converted current value.

Further, in the inverter control apparatus, counting up and down of the clock pulses (not shown) is repeated one time or multiple times in a half period of the first and second carrier signals, the clock cycle having a period equal to or shorter than the half period of the first and second carrier signals. In a case where the period is divided into multiple periods at switchover (at T1, T2, T3, T0') between the counting up and the counting down, the first inverter control unit generates the first trigger based on the first carrier signal of a first period obtained by dividing the half period, and performs inverter control computation of a first of the inverters using a period other than the first period based on a conversion result from the A/D conversion unit started by the first trigger.

REFERENCE SIGNS LIST

1: DIRECT CURRENT POWER SUPPLY
2, 2a, 2b, 2c: INVERTER CIRCUIT
3a, 3b, 3c: SHUNT RESISTOR
4a, 4b, 4c: VOLTAGE AMPLIFIER CIRCUIT
5a, 5b, 5c: BRUSHLESS DC MOTOR
6, 6A: CONTROLLER (INVERTER CONTROL UNIT)
7, 7c: A/D CONVERSION UNIT
10a, 10b, 10c: MOTOR CURRENT CALCULATION UNIT
12a, 12b, 12c: uvw/dq COORDINATE CONVERSION UNIT
13a, 13b, 13c: AVERAGE VALUE OF d/q AXIS CURRENT
14a, 14b, 14c: FILTER
15a, 15b, 15c: dq/uvw COORDINATE CONVERSION UNIT
18a, 18b, 18c: MOTOR APPLIED VOLTAGE COMPUTATIONAL UNIT
20a, 20b, 20c: A/D CONVERTER START TIMING INFORMATION
22a, 22b, 22c: PWM SIGNAL TIMER INFORMATION UNIT
24a: A/D CONVERTER START TRIGGER (FIRST TRIGGER)
24b: A/D CONVERTER START TRIGGER (SECOND TRIGGER)
24c: A/D CONVERTER START TRIGGER
25a, 25b, 25c: PWM SIGNAL GENERATION UNIT
26: A/D START FACTOR SELECTION UNIT
27: VOLTAGE COMMAND VALUE
28: MULTIPLEXER
29: A/D CONVERTER
30: A/D CONVERSION CONTROLLER
31: A/D CONVERSION RESULT REGISTER
31a to 31d: A/D CONVERSION RESULT REGISTER
51: FIRST INVERTER UNIT (FIRST INVERTER CIRCUIT)
52: SECOND INVERTER UNIT (SECOND INVERTER CIRCUIT)
53: THIRD INVERTER UNIT (THIRD INVERTER CIRCUIT)
61: FIRST INVERTER CONTROL UNIT
62: SECOND INVERTER CONTROL UNIT
63: THIRD INVERTER CONTROL UNIT
100, 100A: INVERTER CONTROL APPARATUS
200: REFRIGERATING APPARATUS (AIR CONDITIONER)
201: INDOOR UNIT
202: OUTDOOR UNIT
203: PIPE
204: INDOOR EXPANSION VALVE
205: INDOOR HEAT EXCHANGER
206: FAN MOTOR
207: COMPRESSOR
208: OUTDOOR HEAT EXCHANGER
209: ACCUMULATOR
210: FAN MOTOR
211: BRUSHLESS DC MOTOR
212: HOST APPARATUS

The invention claimed is:

1. An inverter control apparatus comprising:
   inverter circuits configured to convert direct current power into three-phase alternating current power, and to supply three-phase alternating current power to synchronous motors;
   current detection units configured to detect currents flowing through the inverter circuits; and
   an inverter control unit configured to determine and output voltage command values supplied to the synchronous motors based on the detected currents,
   wherein the inverter control unit includes
   an A/D conversion unit that converts the detected currents into digital data;
   a first inverter control unit that generates a first trigger which starts conversion in the A/D conversion unit, based on start timing information of the A/D conversion unit and a first carrier signal;
   a second inverter control unit that generates a second trigger which starts conversion of the A/D conversion unit, based on start timing information of the A/D conversion unit and a second carrier signal; and
   an A/D start factor selection unit that receives either the first trigger or the second trigger, and selects an A/D start factor in a predetermined period of an operation periods of the first carrier signal and the second carrier signal.

2. The inverter control apparatus according to claim 1, wherein counting up and down is repeated one time or multiple times in a half period of the first and second carrier signals,
   wherein in a case where the period is divided into multiple periods at switchover between the counting up and the counting down, the first inverter control unit generates the first trigger based on the first carrier signal of a first period obtained by dividing the half period, and performs inverter control computation of a first of the inverters using a period other than the first period based on a conversion result from the A/D conversion unit started by the first trigger.

3. The inverter control apparatus according to claim 2, wherein when the number of first periods is one, the number of periods other than the first period is n, the n being a natural number equal to or greater than one.

4. The inverter control apparatus according to claim 2,
wherein the first inverter control unit splits the inverter control computation into multiple computations, and executes the multiple computations in the periods other than the first period.

5. The inverter control apparatus according to claim 1,
wherein the first carrier signal and the second carrier signal are synchronously generated such that counting up and down of the first carrier signal substantially coincide with that of the second carrier signal.

6. The inverter control apparatus according to claim 1,
wherein counting up and down of the first carrier signal and the second carrier signal is repeated one time or multiple times in a half period of the first and second carrier signals, and the first carrier signal and the second carrier signal are synchronously generated such that counting up and down of the first carrier signal substantially coincide with that of the second carrier signal, and
wherein in a case where the period is divided into multiple periods at switchover between the counting up and the counting down, the first inverter control unit generates the first trigger based on the first carrier signal of a first period obtained by dividing the period, and the second inverter control unit generates the second trigger based on the second carrier signal, the period of which is divided and which corresponds to a period other than the first period.

7. The inverter control apparatus according to claim 1, further comprising:
a third inverter circuit configured to convert the direct current power into three-phase alternating current power, and to supply three-phase alternating current power to a synchronous motor; and
a third current detection unit configured to detect current flowing through the third inverter circuit,
wherein the inverter control unit includes
a second A/D conversion unit that converts current flowing through the third inverter circuit into digital data; and
a third inverter control unit that generates a third trigger which starts the second A/D conversion unit, based on start timing information regarding the second A/D conversion unit and a third carrier signal.

8. An air conditioner comprising:
the inverter control apparatus according to claim 1.

9. The air conditioner according to claim 8,
wherein the synchronous motors comprise a first fan motor and a second fan motor configured to blow air against a compressor, a heat exchanger, and a heat exchanger;
wherein the inverter circuit comprises a first inverter circuit configured to control the first fan motor; and
a second inverter circuit configured to control the second fan motor.

10. The air conditioner according to claim 8, further comprising:
wherein the synchronous motors comprise a first fan motor and a second fan motor configured to blow air against a compressor, a heat exchanger, and a heat exchanger;
wherein the inverter circuits comprises
a first inverter circuit configured to control the first fan motor; a second inverter circuit configured to control the second fan motor; and
a third inverter circuit configured to control the compressor.

* * * * *